US012643615B2

(12) United States Patent
    Reaves

(10) Patent No.: US 12,643,615 B2
(45) Date of Patent: Jun. 2, 2026

(54) LOG TRAILER LOAD ADJUSTMENT ASSEMBLY

(71) Applicant: Roy Edwin Reaves, Coleman Falls, VA (US)

(72) Inventor: Roy Edwin Reaves, Coleman Falls, VA (US)

( * ) Notice: Subject to any disclaimer, the term of this patent is extended or adjusted under 35 U.S.C. 154(b) by 0 days.

(21) Appl. No.: 19/071,522

(22) Filed: Mar. 5, 2025

(65) Prior Publication Data

US 2025/0282429 A1     Sep. 11, 2025

Related U.S. Application Data

(60) Provisional application No. 63/561,613, filed on Mar. 5, 2024.

(51) Int. Cl.
    *B62D 33/02* (2006.01)
(52) U.S. Cl.
    CPC ................................ *B62D 33/0215* (2013.01)
(58) Field of Classification Search
    CPC ..... B60P 7/132; B60P 1/6481; B62D 33/0215
    See application file for complete search history.

(56) References Cited

U.S. PATENT DOCUMENTS

| | | | | |
|---|---|---|---|---|
| 3,341,216 | A * | 9/1967 | Bradford | B62D 37/00 |
| | | | | 280/6.154 |
| 3,706,464 | A | 12/1972 | Giese et al. | |
| 4,280,712 | A * | 7/1981 | Clark | B62D 33/0215 |
| | | | | 280/414.1 |
| 4,836,735 | A * | 6/1989 | Dennehy, Jr. | B60P 1/6427 |
| | | | | 414/679 |
| 5,110,149 | A | 5/1992 | Dahlstrom | |
| 5,730,455 | A | 3/1998 | May et al. | |
| 5,904,364 | A * | 5/1999 | Wylezinski | B62D 53/067 |
| | | | | 280/425.2 |
| 6,145,863 | A * | 11/2000 | Brown | B60P 3/41 |
| | | | | 280/145 |
| 10,759,321 | B1 * | 9/2020 | Cook, Jr. | B62D 63/061 |
| D1,014,334 | S * | 2/2024 | Metzger | D12/101 |
| 2007/0126196 | A1 | 6/2007 | Klahn | |

FOREIGN PATENT DOCUMENTS

EP 1992523 B1 * 8/2011 ........... B62D 53/067

* cited by examiner

*Primary Examiner* — Paul N Dickson
*Assistant Examiner* — Caitlin Anne Miller

(57) ABSTRACT

A log trailer load adjustment assembly includes a bolster and a plurality of links. The bolster has a crossbar. The plurality of links is at a first end pivotably coupled to a trailer frame and at a second end pivotably coupled to the crossbar such that the bolster can be moved forward or rearward.

7 Claims, 17 Drawing Sheets

121

123

122

124

LOG TRAILER LOAD ADJUSTMENT ASSEMBLY

FIELD OF THE INVENTION

The present invention relates generally to trailer rigs for hauling logs. Specifically, the present invention is a log trailer load adjustment assembly. The present invention is specifically designed for hauling logs. However, the present invention is not limited to this option, and it may further be adapted for carrying poles, beams and other lengthy items.

BACKGROUND OF THE INVENTION

A log trailer is a specialized type of plantation wagon designed specifically for transporting logs and timber on plantation estates. These trailers are essential in timber harvesting operations, allowing workers to efficiently move logs from the forest to processing areas or loading docks. Typically constructed with a sturdy flatbed and reinforced frame, log trailers can carry heavy loads of logs over rough terrain commonly found in wooded areas. They are often equipped with features such as adjustable stakes or bunks to secure the logs during transport, as well as heavy-duty wheels and axles to withstand the weight and demands of the job.

Log trailers used to be pulled by draft animals such as horses or oxen, although in modern times, they are typically pulled by tractors or other motorized vehicles. They play a crucial role in the timber industry, facilitating the efficient harvesting, transportation, and processing of logs for various purposes including lumber production, paper manufacturing, and fuelwood production.

However, the existing log trailers usually are unable to secure logs of varying lengths. It is an objective of the present invention to provide a log trailer load adjustment assembly that can adjust to accommodate logs of varying lengths.

SUMMARY OF THE INVENTION

The present invention discloses a log trailer load adjustment assembly. It comprises a bolster and a plurality of links. The bolster has a crossbar. The plurality of links is at a first end pivotably coupled to a trailer frame and at a second end pivotably coupled to the crossbar such that the bolster can be moved forward or rearward.

In one embodiment, the bolster further comprises a pair of bolter uprights extending from opposing ends of the crossbar.

In one embodiment, each of the plurality of links comprises an upper hole at the first end and a lower hole at the second end. The bolster comprises a plurality of upper link bases. The trailer frame comprises a plurality of lower link bases. The plurality of links is at the first end pivotably coupled to the plurality of upper link bases via a plurality of upper link pins traveling through the upper hole and at a second end pivotably coupled to the plurality of lower link bases via a plurality of lower link pins traveling through the lower hole.

In one embodiment, the plurality of links comprises a right set of links and a left set of links. The plurality of upper link bases comprises a right upper link base and a left upper link base, and the plurality of lower link bases comprises a right lower link base and a left lower link base.

In one embodiment, the right set of links and the left set of links each comprise two parallel links.

In one embodiment, the trailer frame comprises a forward horizontal section, a rearward horizontal section, and a transition section between the forward horizontal section and the rearward horizontal section. The plurality of lower link bases is located at the transition section.

In one embodiment, the forward horizontal section is higher than the rearward horizontal section, and the rearward horizontal section comprises at least one bunk having a plurality of bunk uprights. When moved forward, the bolster rests on the forward horizontal section, and when moved rearward, the bolster abuts against the plurality of bunk uprights.

In one embodiment, The plurality of bunk uprights each comprises a support block that is adapted to support the bolster when the bolster is moved rearward.

In one embodiment, the present invention further comprises a locking mechanism. The locking mechanism comprises a lock frame having a distal end and a proximal end, a hook portion beneath the lock frame and adjacent to the proximal end of the lock frame, and a pivotal connecting portion arranged between the hook portion and the lock frame and connected to the crossbar of the bolster via a plurality of lock mounting plates such that the locking mechanism pivots about a first axis. When the distal end of the lock frame is lowered, the hook portion engages a cross-brace of the trailer frame, and when the distal end of the lock frame is raised, the hook portion disengages from the cross-brace.

In one embodiment, the lock mechanism further comprises a lever having a distal end and a proximal end. The lever is pivotable about a second axis that travels through the proximal end of the lock frame. The proximal end of the lever comprises a weight that rests against the plurality of lock mounting plates and is received in a space between the crossbar of the bolster and the proximal end of the lock frame to prevent the lock frame from being lifted.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

Figure 1:
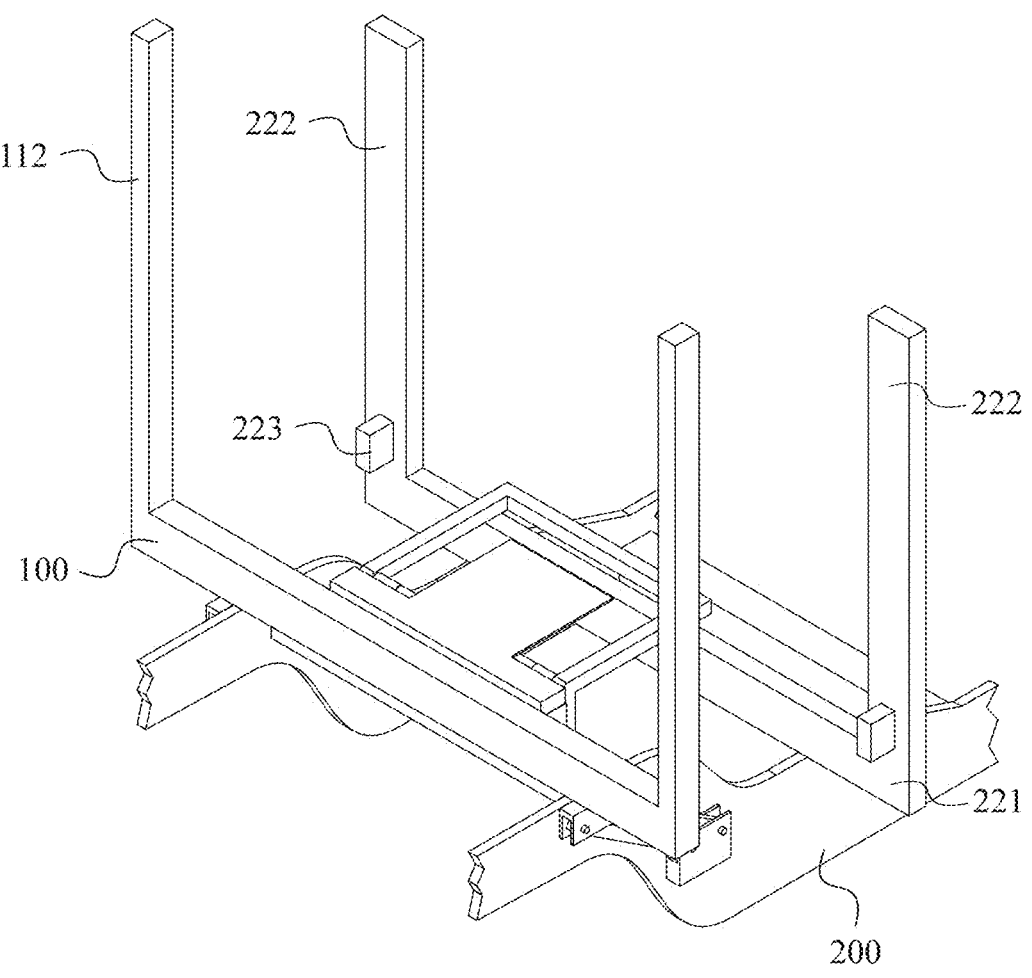
FIG. 1 depicts a perspective view of the present invention, wherein the bolster rests on the forward horizontal section.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of log trailer load adjustment assemblies, embodiments of the present disclosure are not limited to use only in this context.

The present invention is a log trailer load adjustment assembly that is specifically designed log trailers. The present invention allows the existing log trailers to be retrofitted to accommodate logs of varying lengths. It is an aim of the present invention to provide users with a device that locks into place along the trailer frame to create a fixed bolster as needed. It is another aim of the present invention to provide a device that can move back and forth to allow for the difference of point-of-balance when loading logs of varying lengths.

Referring now to the figures of the present disclosure. The log trailer load adjustment assembly of the present invention comprises a bolster 100 having a crossbar 110, and a plurality of links 120.

The bolster 100 is adapted to coupled to a trailer frame 200. It should be noted that the bolster 100 can be of any shape, size, material, features, type or kind, orientation, location, quantity, components, and arrangements of components that would allow the present invention to fulfill the objectives and intents of the present invention. The crossbar 110 is supported on the trailer frame 200. Typically, the crossbar 110 is wider than the trailer frame 200 and extends transversely to the trailer frame 200. In one embodiment, the bolster 100 further comprises a pair of bolter uprights 112 extending from opposing ends of the crossbar 110. The crossbar 110, together with the bolster uprights 112, forms a substantially U-shaped structure to receive and support a payload of logs.

The plurality of links 120 is configured to couple the bolster 100 to the trailer frame 200. It should be noted that the plurality of links 120 can be of any shape, size, material, features, type or kind, orientation, location, quantity, components, and arrangements of components that would allow the present invention to fulfill the objectives and intents of the present invention. In one embodiment, each of the plurality of links 120 is a rectangular cross-sectional tubing. However, it is contemplated that that the cross section may take on other shapes, including but not limited to square, circular, triangular, or other regular or irregular polygonal forms. The plurality of links 120 is designed with a metal material that provides structural strength. The plurality of links 120 is at a first end 121 pivotably coupled to the trailer frame 200 and at a second end 122 pivotably coupled to the crossbar 110 such that the bolster 100 can be moved forward or rearward. Therefore, a user can adjust the positioning of the bolster 100 along the trailer frame 200 as needed to accommodate logs of various lengths.

In one embedment, each of the plurality of links 120 comprises an upper hole 123 at the first end 121 and a lower hole 124 at the second end 122. The bolster 100 comprises a plurality of upper link bases 126, and the trailer frame 200 comprises a plurality of lower link bases 127. The upper link base 126 may be a rectangular shaped bracket that is fixed to the crossbar 110. The lower link base 127 may be designed with a similar shape and fixed to the outside of the trailer frame 200. The plurality of links 120 is at the first end 121 pivotably coupled to the plurality of upper link bases 126 via a plurality of upper link pins 128 traveling through the upper hole 123 and at a second end 122 pivotably coupled to the plurality of lower link bases 127 via a plurality of lower link pins 129 traveling through the lower hole 124. In one embodiment, the plurality of links 120 comprises a right set of links 120*a* and a left set of links 120*b*. The plurality of upper link bases 126 comprises a right upper link base 126*a* and a left upper link base 126*b*, and the plurality of lower link bases 127 comprises a right lower link base 127*a* and a left lower link base 127*b*. In a preferred embodiment, the right set of links 120*a* and the left set of links 120*b* each comprise two parallel links. The parallel links will remain parallel as they pivot about the lower link bases 127. The right set of links 120*a* and the left set of links 120*b* pivot forward or rearward simultaneously, allowing the bolster 100 to move forward or rearward accordingly.

The trailer frame 200 comprises a forward horizontal section 210, a rearward horizontal section 220, and a transition section 230 between the forward horizontal section 210 and the rearward horizontal section 220. The plurality of lower link bases 127 is located at the transition section 230. In one embodiment, the forward horizontal section 210 is higher than the rearward horizontal section 220. The transition section 230 may be an angled off-set section. The forward horizontal section 210 is higher than the rearward horizontal section 220. The trailer frame 200 typically comprises two longitudinal side beams that lie parallel to one another and are interconnected together by a plurality of cross-braces. It is important to note that the figures depict only a portion of the trailer frame 200, and the lengthwise dimension of the trailer frame 200 significantly exceeds its width.

Figure 2:
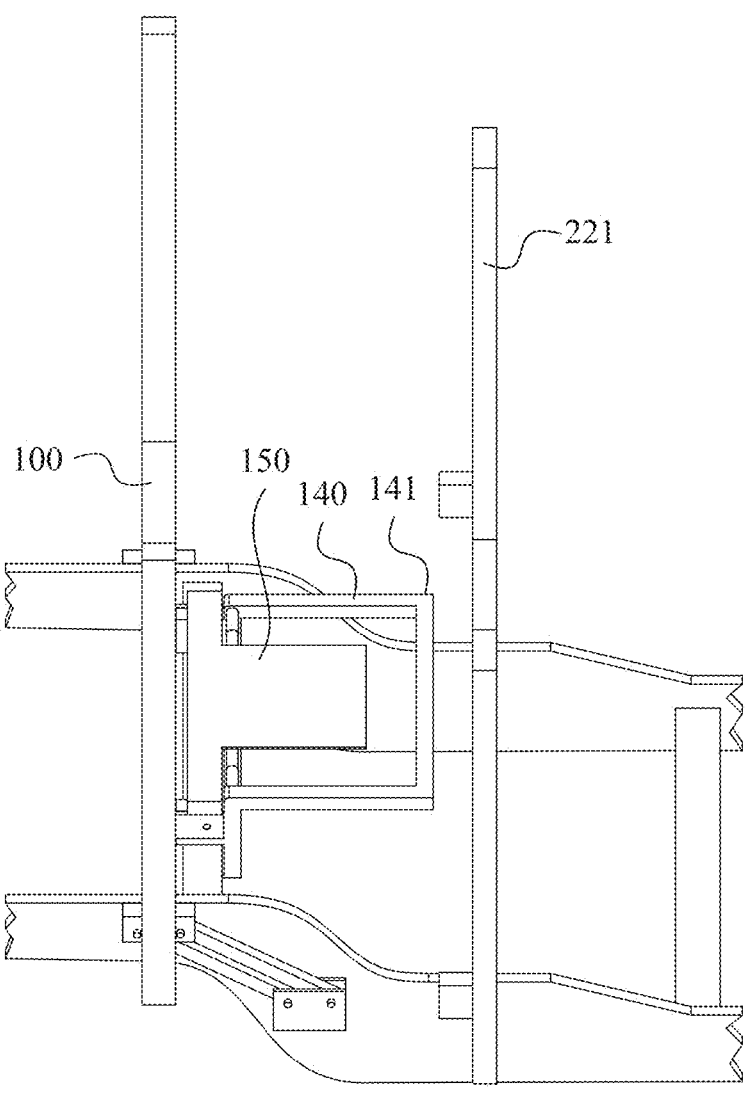
FIG. 2 depicts another perspective view of the present invention, wherein the bolster rests on the forward horizontal section.
Figure 3:
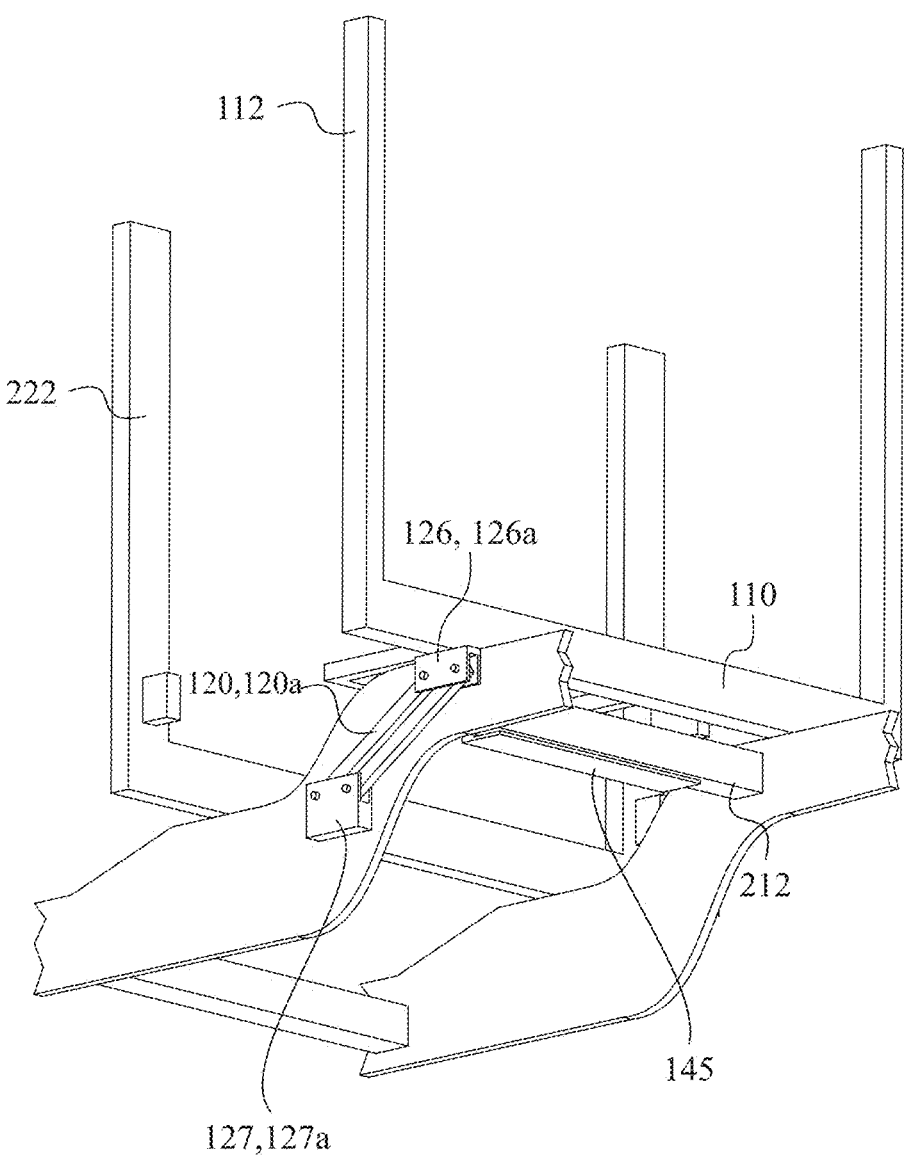
FIG. 3 depicts yet another perspective view of the present invention, wherein the bolster rests on the forward horizontal section.
Figure 4:
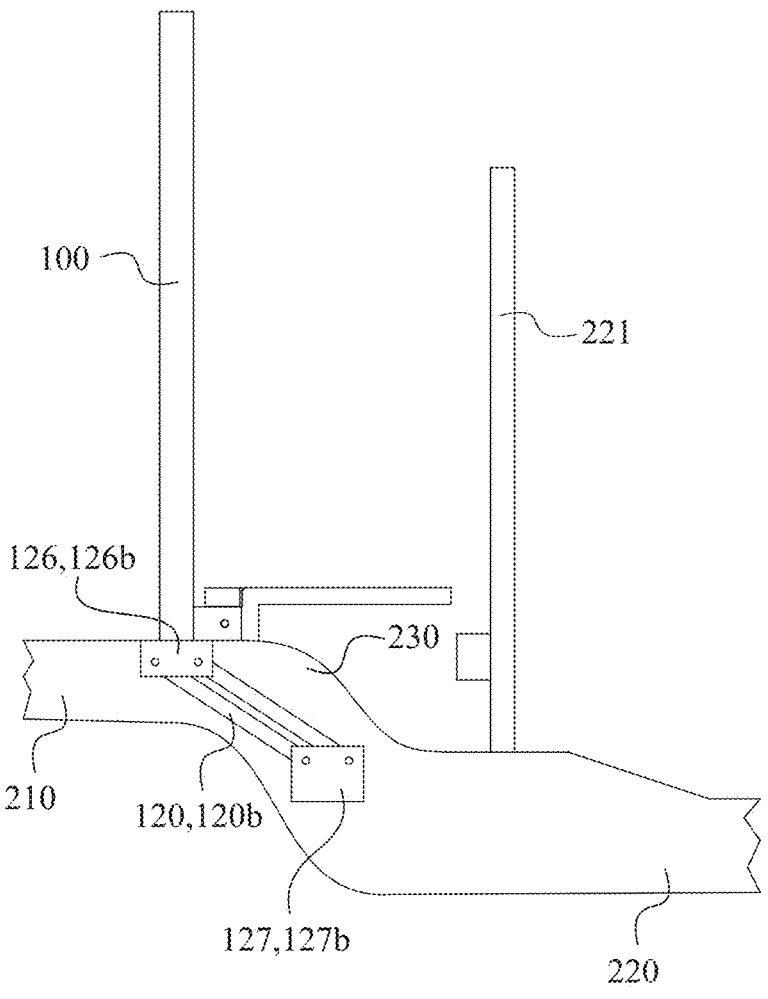
FIG. 4 depicts a right-side view of the present invention, wherein the bolster rests on the forward horizontal section.
Figure 5:
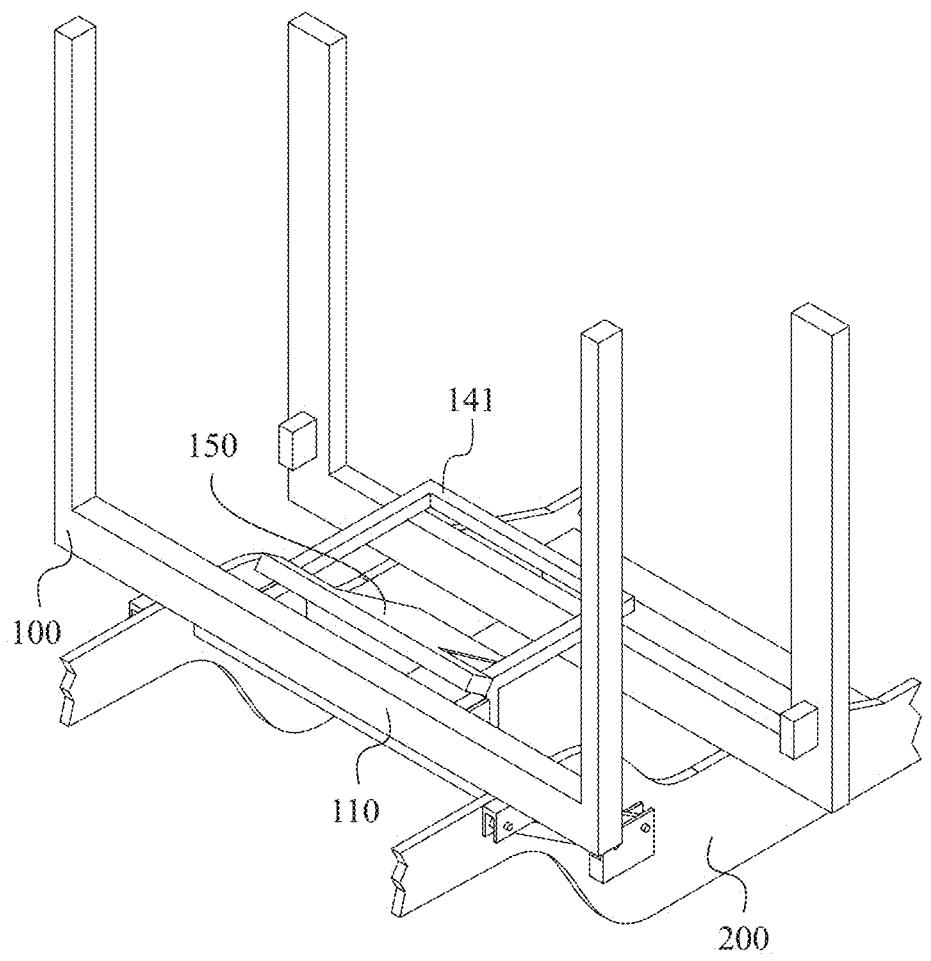
FIG. 5 depicts a perspective view of the present invention, wherein the bolster rests on the forward horizontal section and the distal end of the lever is pressed down.
Figure 6:
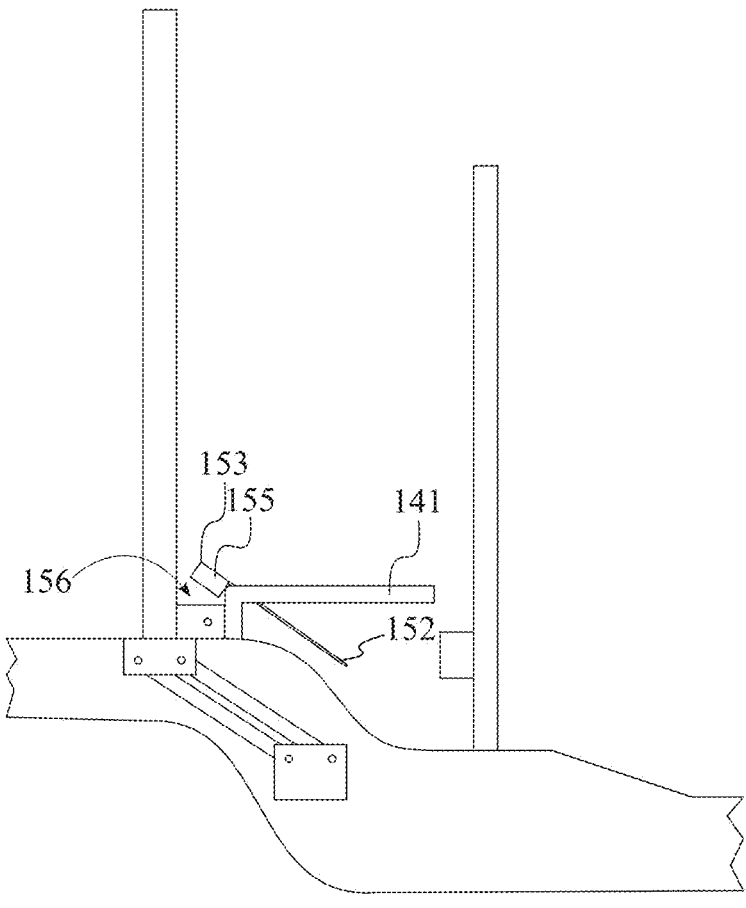
FIG. 6 depicts a right-side view of the present invention, wherein the bolster rests on the forward horizontal section and the distal end of the lever is pressed down.
Figure 7:
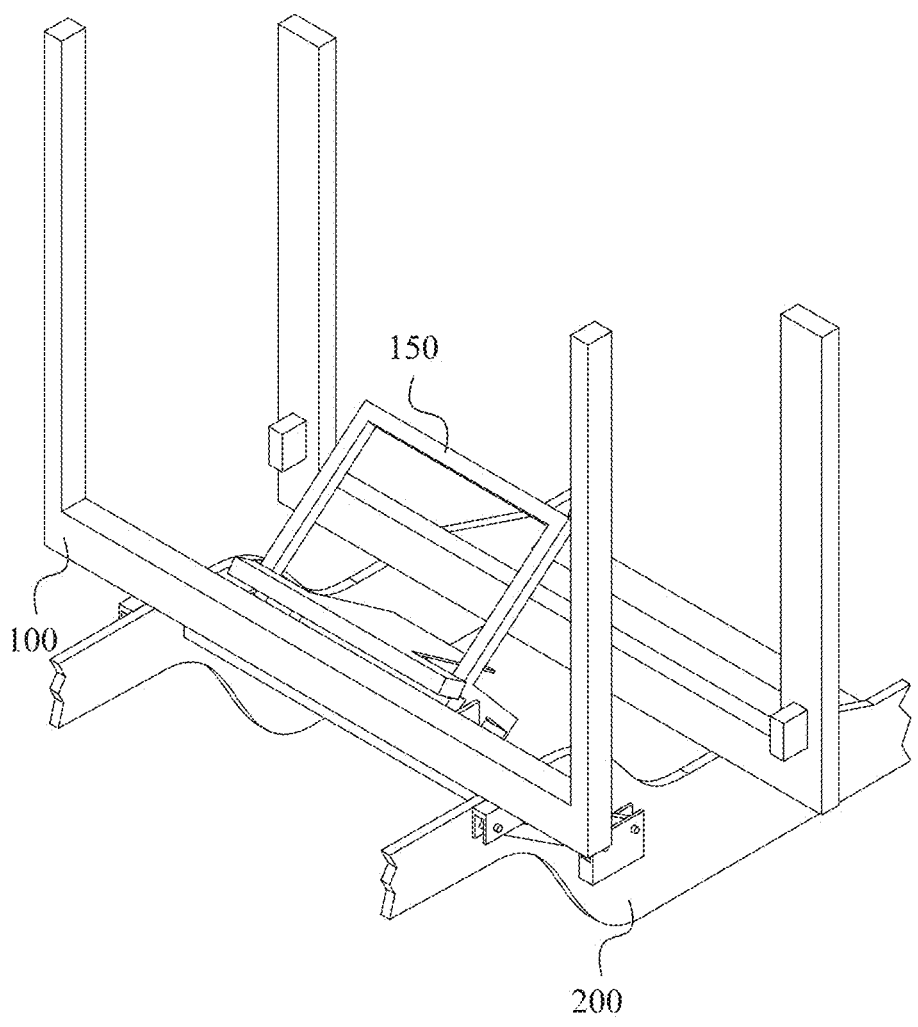
FIG. 7 depicts a perspective view of the present invention, wherein the bolster rests on the forward horizontal section, the distal end of the lever is pressed down, and the distal end of the lock frame is raised.
Figure 8:
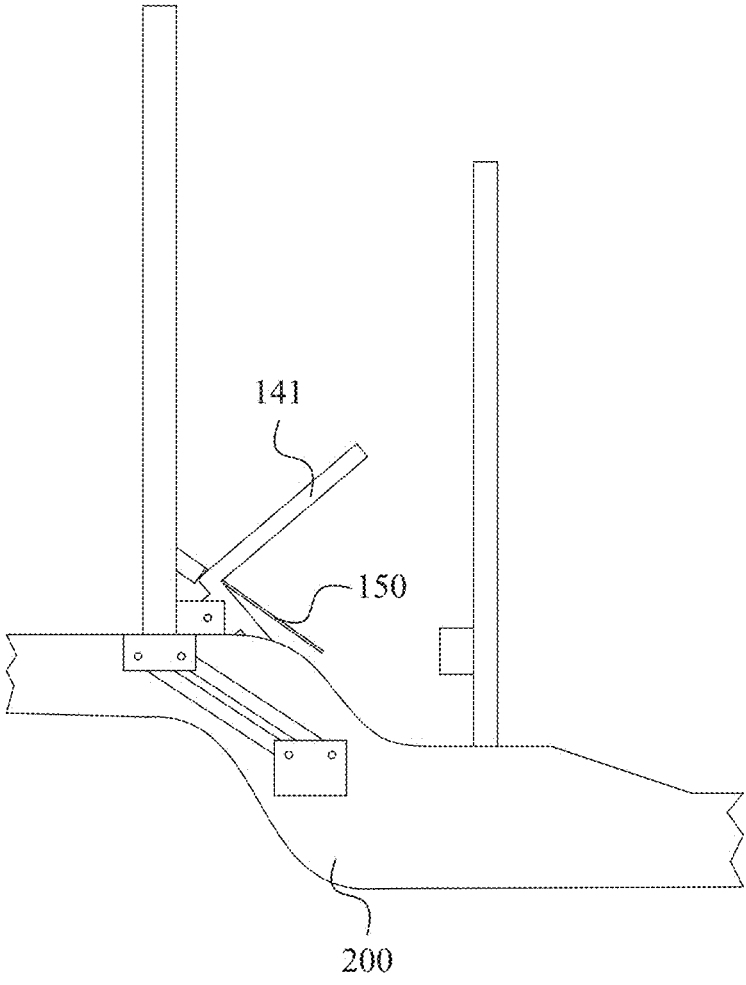
FIG. 8 depicts a right-side view of the present invention, wherein the bolster rests on the forward horizontal section, the distal end of the lever is pressed down, and the distal end of the lock frame is raised.
Figure 9:
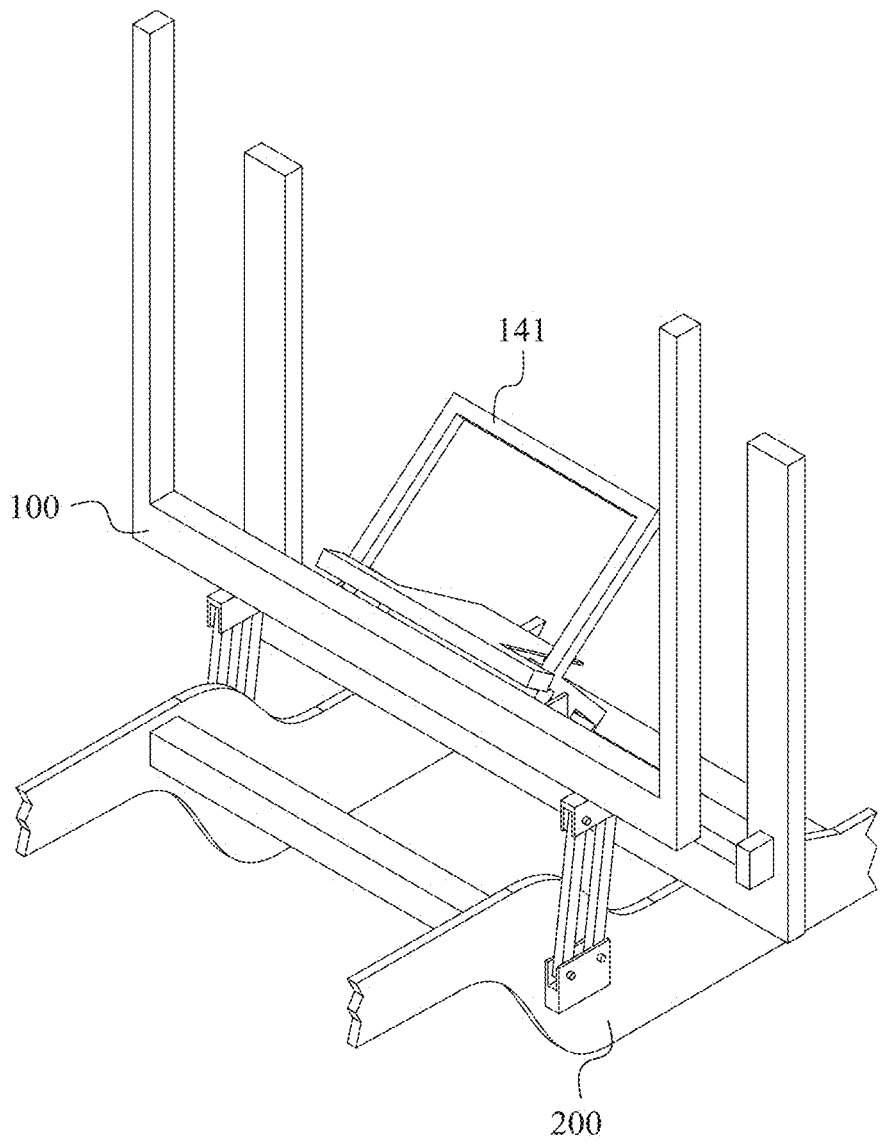
FIG. 9 depicts a perspective view of the present invention, wherein the bolster is being moved rearward.
Figure 10:
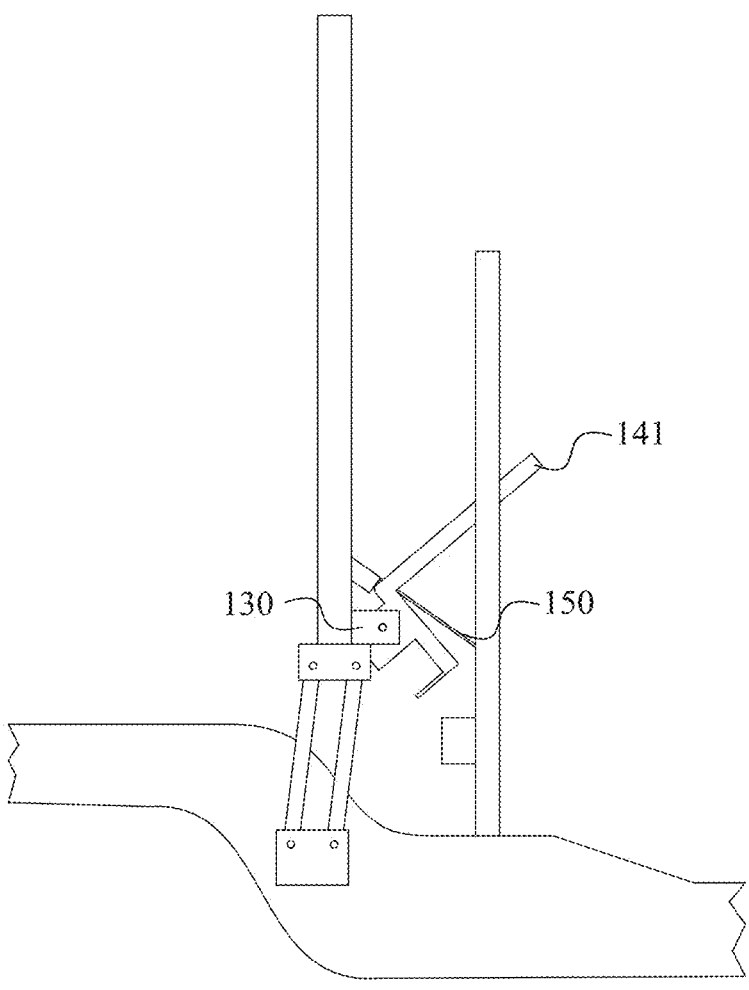
FIG. 10 depicts a right-side view of the present invention, wherein the bolster is being moved rearward.
Figure 11:
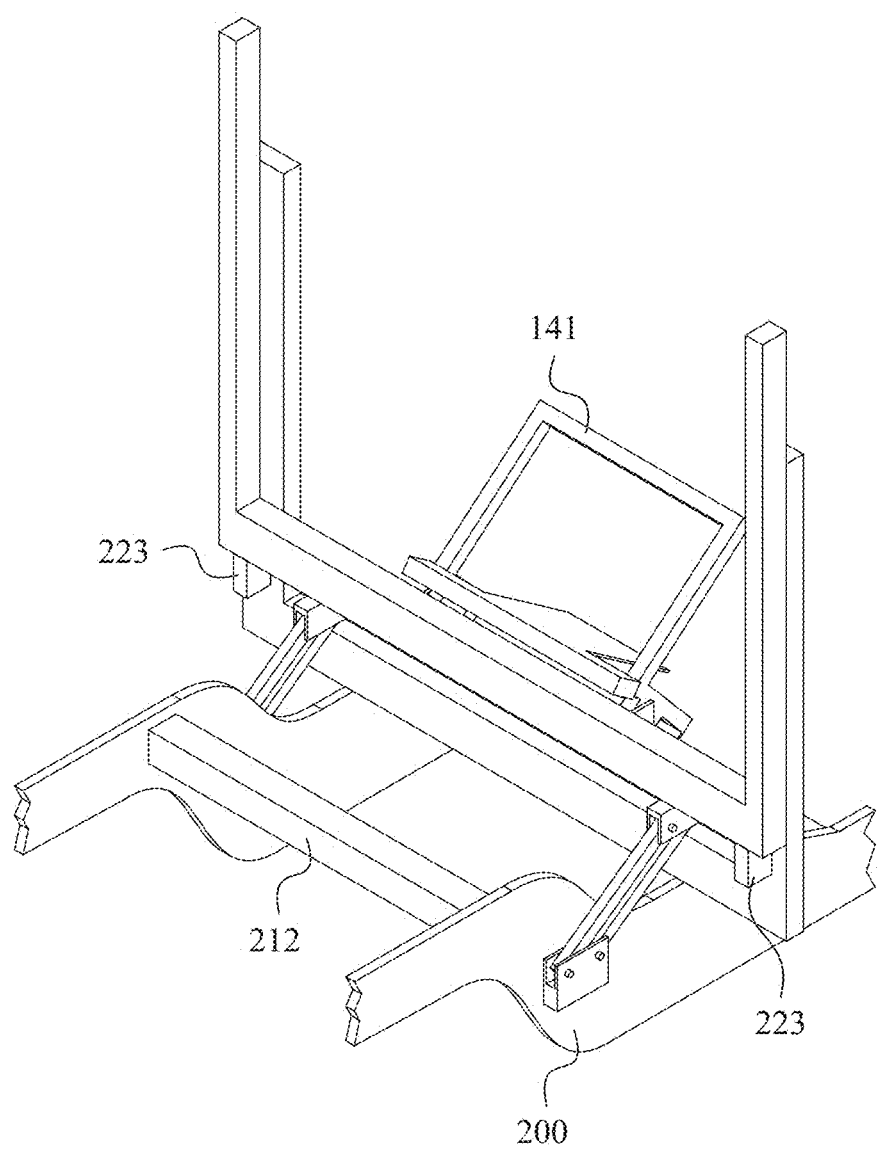
FIG. 11 depicts a perspective view of the present invention, wherein the bolster is moved rearward to abut against the bunk, the distal end of the lever is pressed down, and the distal end of the lock frame is raised.
Figure 12:
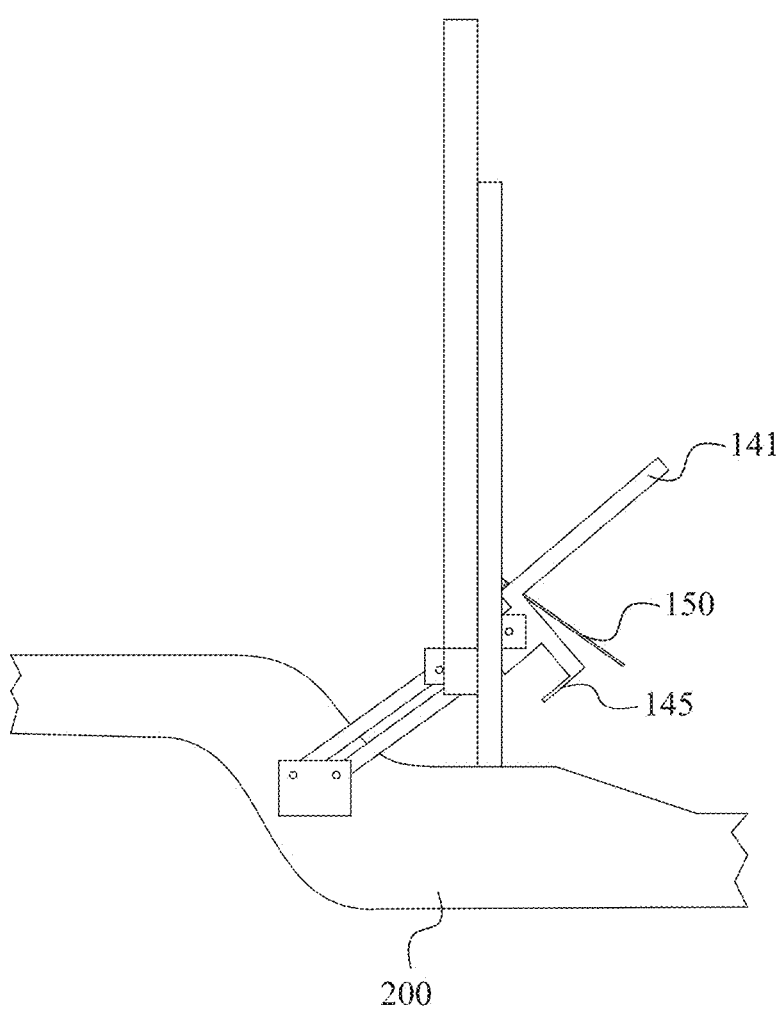
FIG. 12 depicts a right-side view of the present invention, wherein the bolster is moved rearward to abut against the bunk, the distal end of the lever is pressed down, and distal end of the lock frame is raised.
Figure 13:
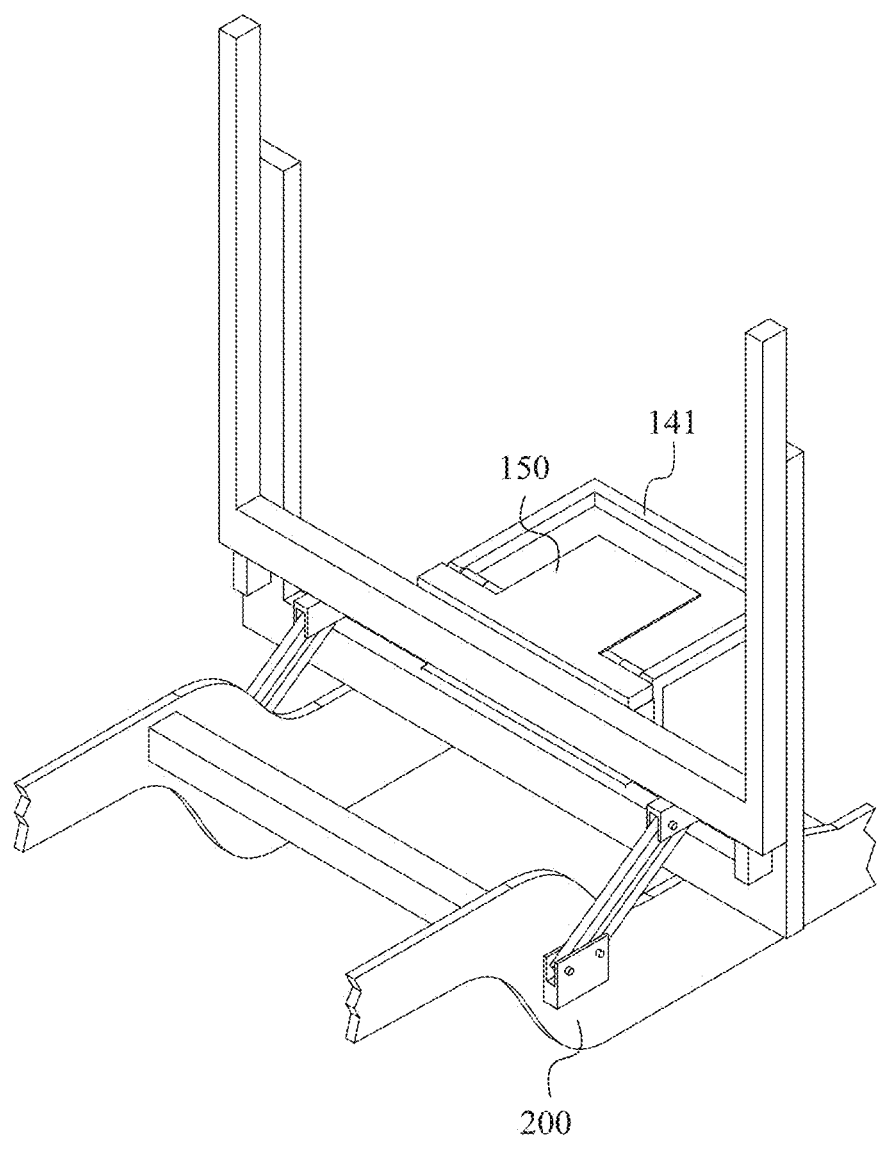
FIG. 13 depicts a perspective view of the present invention, wherein the bolster is moved rearward to abut against the bunk, and the lever and the lock frame are returned to their neutral position due to gravity.
Figure 14:
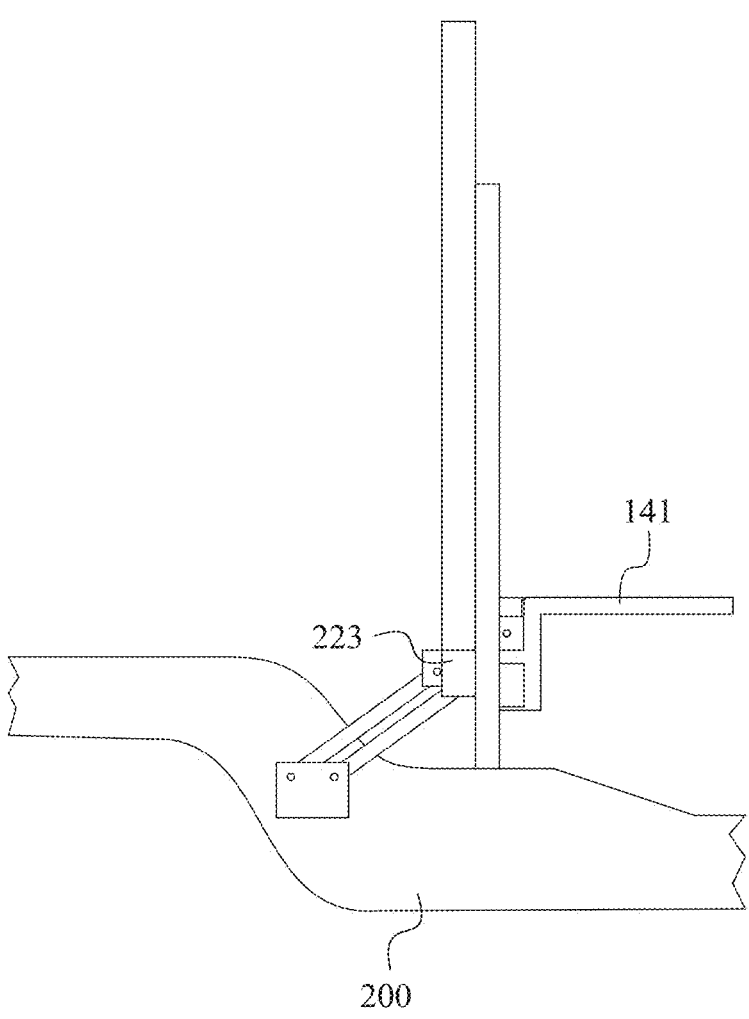
FIG. 14 depicts a right-side view of the present invention, wherein the bolster is moved rearward to abut against the bunk, and the lever and the lock frame are returned to their neutral position due to gravity.
Figure 15:
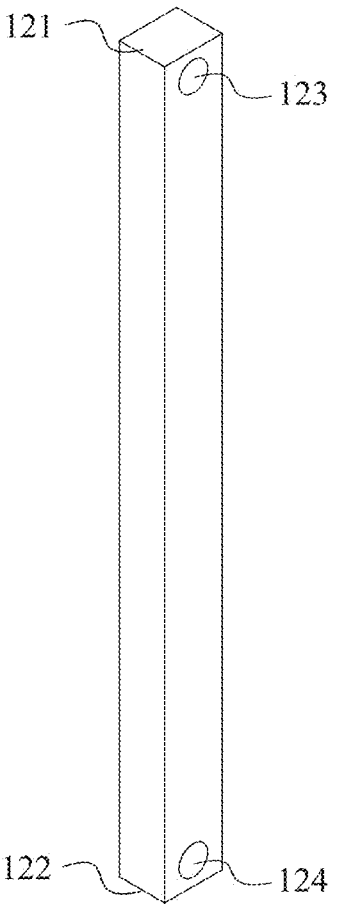
FIG. 15 depicts a perspective view of the link of the present invention.
Figure 16:
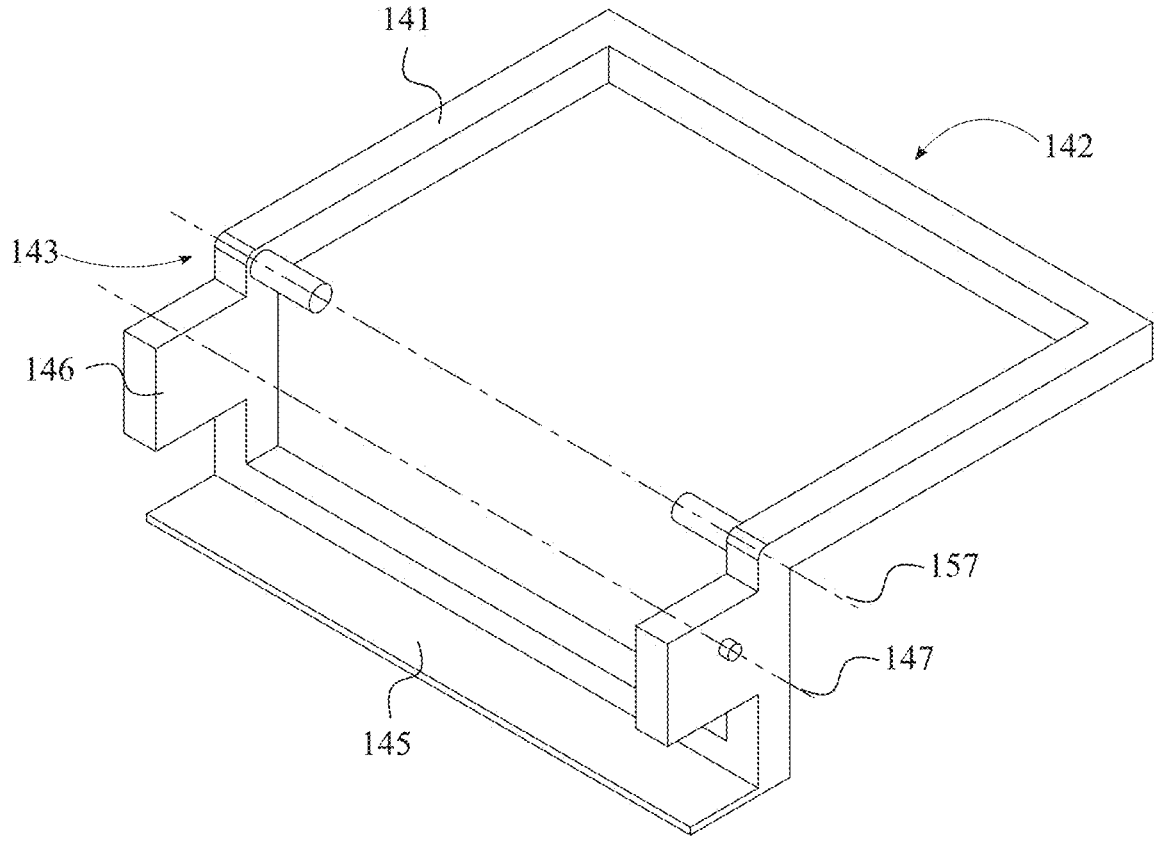
FIG. 16 depicts a perspective view of the lock frame of the present invention.
Figure 17:
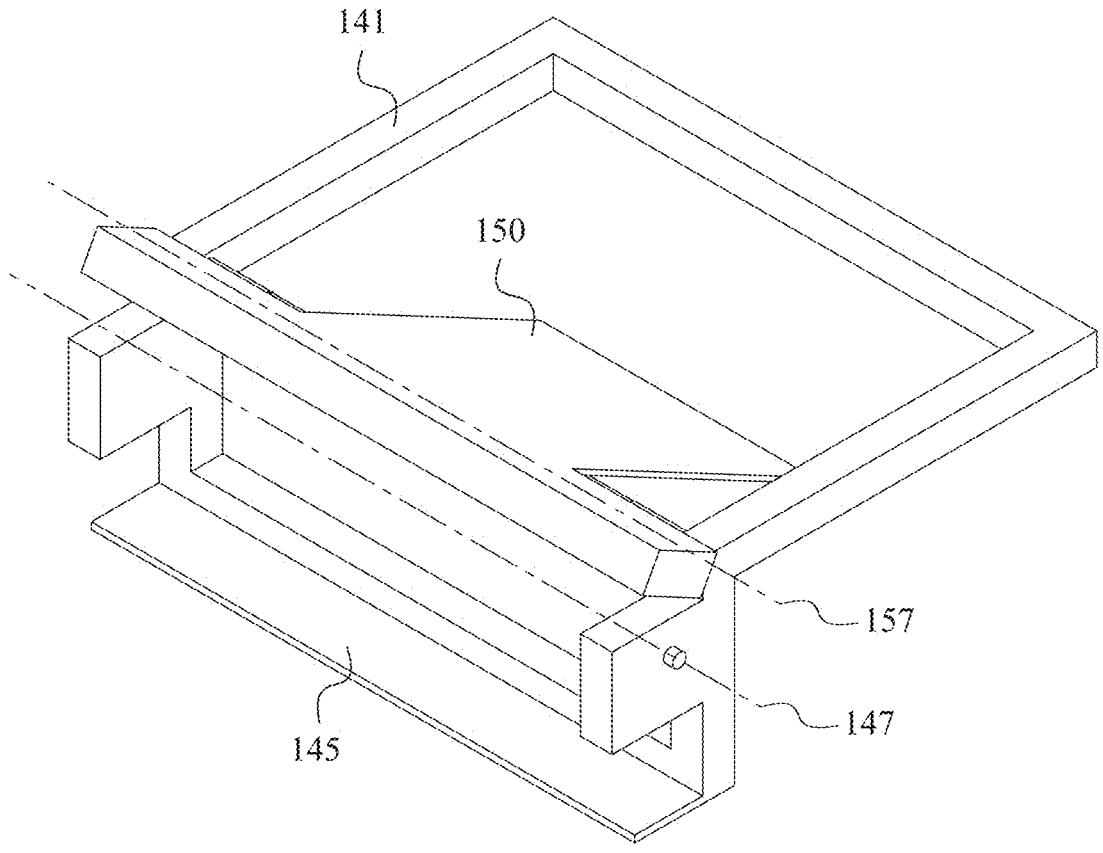
FIG. 17 depicts a perspective view of the locking mechanism of the present invention.

In one embodiment, the rearward horizontal section 220 comprises at least one bunk 221 having a plurality of bunk uprights 222. When moved forward, the bolster 100 rests on the forward horizontal section 210 as shown in FIGS. 1-4, and when moved rearward, the bolster 100 abuts against the plurality of bunk uprights 222 as shown in FIGS. 11-14. In a preferred embodiment, the plurality of bunk uprights 222 each comprises a support block 223 that is adapted to support the bolster 100 when the bolster 100 is moved rearward.

In a preferred embodiment, the present invention further comprises a locking mechanism 140. The locking mechanism 140 comprises a lock frame 141, a hook portion 145, and a pivotal connecting portion 146. The lock frame 141 has a distal end 142 and a proximal end 143. The hook portion 145 is beneath the lock frame 141 and adjacent to the proximal end 143 of the lock frame 141. The pivotal connecting portion 146 is arranged between the hook portion 145 and the lock frame 141 and connected to the crossbar 110 of the bolster 100 via a plurality of lock mounting plates 130 such that the locking mechanism pivots about a first axis 147. The first axis 147 travels through the plurality of lock mounting plates 130 and runs parallel to the lengthwise dimension of the crossbar 110 of the bolster 100. The distal end 142 of the lock frame 141 can be raised or lowered, for example using a log loader, to operate the locking mechanism. When the distal end 142 of the lock frame 141 is lowered, the hook portion 145 engages a cross-brace 212 of the trailer frame 200, preventing the bolster 100 from moving, and when the distal end 142 of the lock frame 141 is raised, the hook portion 142 disengages from the cross-brace 212, allowing the bolster 100 to move.

In one embodiment, the lock mechanism 140 further comprises a lever 150 having a distal end 152 and a proximal end 153. The lever is pivotable about a second axis 157 that travels through the proximal end 143 of the lock frame 141. The proximal end 153 of the lever 150 comprises a weight 155 that rests against the plurality of lock mounting plates 130 and is received in a space 156 between the crossbar 110 of the bolster 100 and the proximal end 143 of the lock frame 141 to prevent the lock frame 141 from being lifted. Due to gravity, the weight 155 creates a rotational force or torque that tends to rotate the lever in a downward direction, positioning the weight 155 within the space 156 when no external forces are applied to the distal end 152 of the lever 150. To unlock the locking mechanism, the user may use a log loader to first press down the distal end 152 of the lever 150, lifting the weight 155 out of the space 156. Next, the distal end 142 of the lock frame 141 may be raised by the log loader to disengage the hook portion 145 from the cross-brace 212. The log loader may then pull the lock frame 141 rearward to move the bolster 100 in the same direction. When the bolster 100 is moved to the desired position, the log loader disconnects from the lock frame, allowing the distal end 142 of the lock frame 141 to lower under the force of gravity. Simultaneously, the weight 155 of the lever 150 returns to the space 156, resting on the plurality of lock mounting plates 130. In this manner, the locking mechanism automatically re-engages and locks into place.

The present invention may be made of any structural rigid material such as cast aluminum, steel or any other suitable materials or using any suitable combination thereof. It should be understood that the components of the present invention may or may not be made of the same material. Further, it is envisioned that the sizes of the components forming the present invention can vary based on design requirements.

Although the disclosure has been explained in relation to its preferred embodiment, it is to be understood that many other possible modifications and variations can be made without departing from the spirit and scope of the disclosure.

What is claimed is:

1. A log trailer load adjustment assembly comprising:
a trailer frame comprising a plurality of lower link bases;
a bolster having a crossbar and a plurality of upper link bases;
a plurality of links comprising a right set of links and a left set of links;
wherein each of the plurality of links comprises a first end having a lower hole and a second end having an upper hole;
wherein the first end of each link is pivotably coupled to one of the plurality of lower link bases via a lower link pin traveling through the lower hole, and the second end of each link is pivotably coupled to one of the plurality of upper link bases via an upper link pin traveling through the upper hole, such that the bolster can be moved forward or rearward; and
wherein the right set of links and the left set of links each comprise two parallel links.

2. The log trailer load adjustment assembly as claimed in claim 1, wherein the bolster further comprises a pair of bolster uprights extending from opposing ends of the crossbar.

3. The log trailer load adjustment assembly as claimed in claim 1, wherein the trailer frame comprises a forward horizontal section, a rearward horizontal section, and a transition section between the forward horizontal section and the rearward horizontal section, the plurality of lower link bases being located at the transition section.

4. The log trailer load adjustment assembly as claimed in claim 3, wherein the forward horizontal section is higher than the rearward horizontal section, and the rearward horizontal section comprises at least one bunk having a plurality of bunk uprights, wherein when moved forward, the bolster rests on the forward horizontal section, and when moved rearward, the bolster abuts against the plurality of bunk uprights.

5. The log trailer load adjustment assembly as claimed in claim 4, wherein the plurality of bunk uprights each comprises a support block that is adapted to support the bolster when the bolster is moved rearward.

6. A log trailer load adjustment assembly comprising:
a bolster having a crossbar;
a plurality of links;
the plurality of links being at a first end pivotably coupled to a trailer frame and at a second end pivotably coupled to the crossbar such that the bolster can be moved forward or rearward;
a locking mechanism that comprises:
a lock frame having a distal end and a proximal end;
a hook portion beneath the lock frame and adjacent to the proximal end of the lock frame;
a pivotal connecting portion arranged between the hook portion and the lock frame and connected to the crossbar of the bolster via a plurality of lock mounting plates such that the locking mechanism pivots about a first axis;
wherein each of the plurality of links comprises a lower hole at the first end and an upper hole at the second end, the bolster comprises a plurality of upper link bases, and the trailer frame comprises a plurality of lower link bases, the plurality of links being at the first end pivotably coupled to the plurality of lower link bases via a plurality of lower link pins traveling through the lower hole and at a second end pivotably coupled to the plurality of upper link bases via a plurality of upper link pins traveling through the upper hole;
wherein the trailer frame comprises a forward horizontal section, a rearward horizontal section, and a transition section between the forward horizontal section and the rearward horizontal section, the plurality of lower link bases being located at the transition section;
wherein the forward horizontal section is higher than the rearward horizontal section, and the rearward horizontal section comprises at least one bunk having a plurality of bunk uprights, wherein when moved forward, the bolster rests on the forward horizontal section, and when moved rearward, the bolster abuts against the plurality of bunk uprights;
wherein the plurality of bunk uprights each comprises a support block that is adapted to support the bolster when the bolster is moved rearward; and
wherein when the distal end of the lock frame is lowered, the hook portion engages a cross-brace of the trailer frame, and when the distal end of the lock frame is raised, the hook portion disengages from the cross-brace.

7. A log trailer load adjustment assembly comprising:
a bolster having a crossbar;
a plurality of links;
the plurality of links being at a first end pivotably coupled to a trailer frame and at a second end pivotably coupled to the crossbar such that the bolster can be moved forward or rearward;
a locking mechanism that comprises:
a lock frame having a distal end and a proximal end;
a hook portion beneath the lock frame and adjacent to the proximal end of the lock frame;
a pivotal connecting portion arranged between the hook portion and the lock frame and connected to the crossbar of the bolster via a plurality of lock mounting plates such that the locking mechanism pivots about a first axis;
wherein each of the plurality of links comprises a lower hole at the first end and an upper hole at the second end, the bolster comprises a plurality of upper link bases, and the trailer frame comprises a plurality of lower link bases, the plurality of links being at the first end pivotably coupled to the plurality of lower link bases via a plurality of lower link pins traveling through the lower hole and at a second end pivotably coupled to the plurality of upper link bases via a plurality of upper link pins traveling through the upper hole;

wherein the trailer frame comprises a forward horizontal section, a rearward horizontal section, and a transition section between the forward horizontal section and the rearward horizontal section, the plurality of lower link bases being located at the transition section;

wherein the forward horizontal section is higher than the rearward horizontal section, and the rearward horizontal section comprises at least one bunk having a plurality of bunk uprights, wherein when moved forward, the bolster rests on the forward horizontal section, and when moved rearward, the bolster abuts against the plurality of bunk uprights;

wherein the plurality of bunk uprights each comprises a support block that is adapted to support the bolster when the bolster is moved rearward;

wherein when the distal end of the lock frame is lowered, the hook portion engages a cross-brace of the trailer frame, and when the distal end of the lock frame is raised, the hook portion disengages from the cross-brace; and wherein the lock mechanism further comprises a lever having a distal end and a proximal end, the lever being pivotable about a second axis that travels through the proximal end of the lock frame, the proximal end of the lever comprising a weight that rests against the plurality of lock mounting plates and is received in a space between the crossbar of the bolster and the proximal end of the lock frame to prevent the lock frame from being lifted.

\* \* \* \* \*